United States Patent
Zhang et al.

(10) Patent No.: US 9,998,928 B2
(45) Date of Patent: *Jun. 12, 2018

(54) RAPID INDOOR WIRELESS SIGNAL FINGERPRINT DATABASE CREATION THROUGH CALIBRATION OF RAY-TRACING PROPAGATION MODEL

(71) Applicant: RANPLAN WIRELESS NETWORK DESIGN LTD, Cambridge (GB)

(72) Inventors: Jie Zhang, Luton (GB); Joyce Wu, Luton (GB); Chunxia Qin, Jinan (CN); Zhihua Lai, Cambridge (GB)

(73) Assignee: RANPLAN WIRELESS NETWORK DESIGN LTD, Cambridge (GB)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/108,233

(22) PCT Filed: Dec. 24, 2014

(86) PCT No.: PCT/GB2014/053847
§ 371 (c)(1),
(2) Date: Jun. 24, 2016

(87) PCT Pub. No.: WO2015/097481
PCT Pub. Date: Jul. 2, 2015

(65) Prior Publication Data
US 2016/0323753 A1    Nov. 3, 2016

(30) Foreign Application Priority Data

Dec. 24, 2013 (CN) .......................... 2013 1 0724675

(51) Int. Cl.
H04W 16/20 (2009.01)
H04B 1/707 (2011.01)
(Continued)

(52) U.S. Cl.
CPC ........... *H04W 16/20* (2013.01); *G01S 5/0252* (2013.01); *H04B 1/707* (2013.01); *H04B 17/318* (2015.01);
(Continued)

(58) Field of Classification Search
CPC ..... H04W 16/20; H04W 24/06; H04W 64/00; H04W 88/08; H04W 84/12; H04B 1/707; H04B 17/318; G01S 5/0252
See application file for complete search history.

(56) References Cited

U.S. PATENT DOCUMENTS

2007/0155401 A1   7/2007  Ward et al.
2008/0057873 A1*  3/2008  Huang ................. H04W 16/20
                                                           455/67.11
(Continued)

FOREIGN PATENT DOCUMENTS

CN    101547506 A    9/2009
CN    103384358 A    11/2013

OTHER PUBLICATIONS

International Search Report dated Apr. 8, 2015 for PCT Application No. PCT/GB2014/053847, filed Dec. 24, 2014, 5 pages.
(Continued)

*Primary Examiner* — Kamran Afshar
*Assistant Examiner* — Minjung Kim
(74) *Attorney, Agent, or Firm* — Mintz Levin Cohn Ferris Glovsky and Popeo, P.C.

(57) ABSTRACT

A method for rapidly creating an indoor wireless signal fingerprint database, comprising the following steps: constructing an indoor and outdoor combined three-dimensional scene model of a target building, predicting wireless signal field intensity information of 3D space using a ray-tracing algorithm, selecting a small quantity of testing points to perform manual field measurements and recording the wire-
(Continued)

less signal intensity information, correcting/calibrating 3D ray-tracing propagation model parameters based on the difference between the actually measured wireless signal intensity information and the theoretical wireless signal intensity information calculated through the 3D ray-tracing propagation model.

9 Claims, 6 Drawing Sheets

(51) Int. Cl.
    *H04B 17/318*    (2015.01)
    *H04W 24/06*    (2009.01)
    *H04W 64/00*    (2009.01)
    *G01S 5/02*    (2010.01)
    *H04W 84/12*    (2009.01)
    *H04W 88/08*    (2009.01)

(52) U.S. Cl.
    CPC .......... *H04W 24/06* (2013.01); *H04W 64/00* (2013.01); *H04W 84/12* (2013.01); *H04W 88/08* (2013.01)

(56) References Cited

U.S. PATENT DOCUMENTS

| | | |
|---|---|---|
| 2009/0082034 A1 | 3/2009 | Gray et al. |
| 2010/0311436 A1 | 12/2010 | Bevan et al. |
| 2013/0035109 A1* | 2/2013 | Tsruya .................. G01S 5/0252 |
| | | 455/456.1 |
| 2014/0171098 A1* | 6/2014 | Marti .................... G01S 5/0252 |
| | | 455/456.1 |

OTHER PUBLICATIONS

Raspopoulos et al., "Cross Device Fingerprint-Based Positioning Using 3D Ray Tracing," 2012 8th International Wireless Communications and Mobile Computing Conference, Aug. 27-31, 2012, pp. 147-152.

Viol et al., "Hidden Markov Model-Based 3D Path-Matching Using Raytracing-Generated Wi-Fi Models," 2012 International Conference on Indoor Positioning and Indoor Navigation, Nov. 13-15, 2012, pp. 1-10.

* cited by examiner

RAPID INDOOR WIRELESS SIGNAL FINGERPRINT DATABASE CREATION THROUGH CALIBRATION OF RAY-TRACING PROPAGATION MODEL

CROSS-REFERENCE TO RELATED APPLICATIONS

This application is a national stage entry, filed under 35 U.S.C. § 371, of International Application No. PCT/GB2014/053847, filed on Dec. 24, 2014, which claims the benefit of and priority to Chinese Patent Application No. 201310724675.6, filed Dec. 24, 2013, the entire contents of each of which are incorporated herein by reference in their entireties and for all purposes.

TECHNICAL FIELD

The present invention relates to a method for rapidly establishing an indoor wireless signal fingerprint database, belonging to the technical field of electromagnetic wave propagation prediction in mobile communication.

BACKGROUND

With the development of wireless communication technology, situation where various wireless communication networks coexist is becoming more and more prominent, in general, a user may receive wireless signals transmitted from a plurality of wireless access devices at one position and reasonably utilize the wireless signals transmitted from the plurality of wireless access devices. An indoor wireless signal fingerprint database is established which is not only applied for judging indoor weak coverage area of the wireless communication network, positioning defective devices of an outdoor macro base station and an indoor distributed system, analyzing wireless network optimization and maintenance field such as wireless network interference and the like, and but also applied to other application fields such as indoor positioning and navigation and the like. However, current methods for establishing an indoor wireless signal fingerprint database are mostly dependent upon manual field measurements, this process is very complex for large scenes and complex networks, especially when number and position of the network access devices are changed, it needs to remeasure and wastes time and energy.

In a Chinese patent for invention (with application number 201310244665.2, title: Ray tracing propagation model-based indoor wireless signal prediction method), wireless signal field intensity of three-dimensional (3D) space can be predicted rapidly using the technical solution of the patent, however, this invention does not mention a method for establishing an indoor wireless signal fingerprint database.

In a Chinese patent for invention (with application number 201310244863.9, title: Method for establishing and correcting building material wireless propagation loss parameter database), although a method for correcting the building material wireless propagation loss parameter database using the actually measured 3D space wireless signal field intensity, thereby correcting ray tracing propagation model parameters, there is no mention of a method for establishing an indoor wireless signal fingerprint database using the corrected propagation model parameters.

A Chinese paper *Radio Map Reconstruction Technology in Indoor Fingerprint Positioning Algorithm* mentions a method for reconstructing a Radio map (Radio map refers to wireless signal fingerprint) database, which can reduce time for indoor positioning algorithm and capacity of the database by removing abnormal data from a fingerprint map and combining the propagation model to divide areas of the Radio map, however, this paper does not mention Radio map database establishment and acquisition method.

A Chinese master's thesis *Indoor Radio-map Establishment Method and Performance Analysis* mentions a grid interpolation Radio-map generation algorithm based on singular point filter, which can effectively maintain accuracy of the database under the premise of reducing half of workload than the conventional method. However, there is still great workload after half is reduced, especially when number and position of the network access devices are changed, it needs to remeasure Radio-map database.

In a word, a current technical problem that needs to be solved urgently by persons skilled in the art is: how to rapidly establish an indoor wireless signal fingerprint database.

SUMMARY OF THE INVENTION

The present invention is aimed to solve the technical problem, and provides a method for rapidly establishing an indoor wireless signal fingerprint database, and is advantageous in rapidly establishing an indoor wireless signal fingerprint database.

To achieve the objective, aspects of the present invention adopts the following technical solutions:

According to a first aspect of the present invention there is provided a method for rapidly establishing an indoor wireless signal fingerprint database comprise: constructing an indoor and outdoor combined three-dimensional (3D) scene model of a target building, predicting wireless signal field intensity information of 3D space, selecting a small quantity of testing points to perform manual field measurements and recording the wireless signal intensity information, correcting 3D ray tracing propagation model parameters depending on difference between the actually measured wireless signal intensity information and the wireless signal intensity information calculated through the principle of the 3D ray tracing propagation model, predicting and establishing a wireless signal fingerprint database of the indoor and outdoor combined 3D scene model through the corrected 3D ray tracing propagation model parameters.

According to a second aspect of the present invention there is provided a method for rapidly establishing an indoor wireless signal fingerprint database, comprising the following steps: constructing an indoor and outdoor combined three-dimensional (3D) scene model of a target building, predicting wireless signal field intensity information of 3D space, selecting a small quantity of testing points, within the target building, to perform manual field measurements and recording the wireless signal intensity information, correcting propagation model parameters depending on the difference between the actually measured wireless signal intensity information and the wireless signal intensity information calculated through the principle of the propagation model, predicting and establishing a wireless signal fingerprint database of the indoor and outdoor combined 3D scene model through the corrected propagation model parameters.

The wireless signal fingerprint database may comprise a plurality of wireless signal fingerprint data records, each of which comprises geographical location information recorded by the wireless signal fingerprint data, and labeling information and signal intensity information that can be received by one or more wireless access devices on the geographical location.

A method for rapidly establishing an indoor wireless signal fingerprint database specifically may comprise:

Step (1): constructing an indoor and outdoor combined three-dimensional spatial structural model of a target scene, wherein the scene comprises an indoor three-dimensional scene of a target building and an outdoor three-dimensional scene around the target building;

Step (2): recording and storing information of wireless access device which can be received by the target scene;

Step (3): selecting a small quantity of testing points in the indoor of the target building to perform measurement on site and recording the wireless signal fingerprint information that is actually measured at the selected testing points, the wireless signal fingerprint information that is actually measured refers to the labeling information and the wireless signal intensity information of the wireless access device transmitted by the wireless access device in the step (2);

Step (4): obtaining theoretical wireless signal fingerprint information of the testing points selected in the step (3), wherein the theoretical wireless signal fingerprint information includes wireless access device labeling information and theoretical wireless signal intensity information that is obtained through calculation by the 3D ray tracing propagation model algorithm;

Step (5): correcting parameters of the 3D ray tracing propagation model depending on difference between the wireless signal intensity information that is actually measured in the step (3) and the wireless signal intensity information that is calculated theoretically in the step (4);

Step (6): recalculating the wireless signal intensity information of the wireless access device of the step (2) at the indoor and outdoor combined 3D spatial structural model as described in the step (1);

Step (7): determining number and position of sampling points at the set sampling density on the set horizontal plane within each floor of a building on the basis of floor area of the building space; forming position information of a sampling point, wireless access device labeling information at the position and corresponding wireless signal intensity information data of the sampling point calculated in the step (6) into a data record to be stored in the wireless signal fingerprint database; obtaining wireless signal fingerprint data records of all other sampling points by the same method, to form the wireless signal fingerprint database.

When the indoor and outdoor combined 3D spatial structure in the step (1) is changed, it may need to recalculate the update the wireless signal fingerprint database using the steps (1) to (7);

when transmitting antenna frequency of the wireless access device in the step (2) is changed (such as a new type of wireless network is established in the area, the original type of wireless network spreads spectrum), it may need to recalculate and update the wireless signal fingerprint database by reusing the steps (2) to (7);

when other parameters except the transmitting antenna frequency of the wireless access device in the step (2) are changed, it may need to recalculate and update the wireless signal fingerprint database by reusing the steps (6) and (7), wherein the other parameters include number of the transmitting antenna, position of the transmitting antenna, transmitting power, 3D radiation parameters of the transmitting antenna, inclination angle of the transmitting antenna.

The step (1) specifically may comprise: converting the building drawings in a CAD format of the target building into a 3D spatial structural model of the building, converting a GIS map around the building into an outdoor 3D spatial structural model, combining the indoor 3D spatial structural model of the target building and the outdoor 3D spatial structural model around the building into an indoor and outdoor combined 3D spatial structural model of the scene, recording and storing the 3D spatial structural model data which includes size of the building, layout structure of the building, building material and wireless propagation loss parameters of the building material.

The wireless access device in the step (2) may comprise a wireless communication base station (NodeB) or a wireless local area network access point (Access Point, AP).

The wireless access device in the step (2) may comprise transmitting antenna data corresponding to each wireless access device, the transmitting antenna data comprises number of the transmitting antennas, specific location information of the transmitting antennas, signal frequency of the transmitting antennas, transmitting frequency of the transmitting antennas, 3D radiation parameters of the transmitting antennas and the inclination angle of the transmitting antennas.

The positions of the small quantity of testing points in the step (3) may be selected depending on complexity of the building model, size of the building, difficulty of on-site measurement; the positions of the testing points are spaced at a distance to guarantee that different wireless signal fingerprint data information can be distinguished;

the wireless access device labeling information in the step (4) may be read from the parameters of the wireless access device, the theoretical wireless signal intensity information is obtained through calculation by the 3D ray tracing propagation model algorithm. Specific steps are as described in the steps (4-1) to (4-8).

Signal intensity of a transmitting antenna received from a reception point within the target building may be predicted using ray tracing propagation model algorithm, specific steps are as described in the steps (4-1) to (4-6):

(4-1) determining all propagation paths by which the rays transmitted by the transmitting antennas reach the reception point i based on the positions of the transmitting antennas and the reception point: N is the total number of the propagation paths by which the transmitting antennas reach the reception point i;

(4-2) calculating propagation loss of each propagation path in free space, wherein the loss value of the k-th path in the free space is $L_p(f, d_k)$ ($1 \leq k \leq N$), f is signal frequency (MHz), $d_k$ is distance (km) that the k-th path transfers in the free space; regardless of transmission, reflection and diffraction phenomenon, the loss value (dB) of the k-th path in the free space is calculated in the following formula:

$$L_p(f, d_k) = 20 \log 10(f) + 20 \log 10(d_k) + 32.45$$

(4-3) calculating loss of each propagation path under the influence of the building material, wherein $L_{MAT}(f)$ is the sum of attenuation of transmission, reflection and diffraction due to the building material on the k-th path; T is the total amount of the building material within the target building, the j-th kinds of material is represented as $M_j$ ($1 \leq j \leq T$), are $\delta t$, $\delta d$, $\delta r$ are coefficients respectively indicating whether or not the wireless signals on the k-th path are in transmissive, diffractive, reflective relationship with the building material, $$\delta t = \begin{cases} 0, & \text{when transmission of the material } Mj \\ & \text{does not exist} \\ 1, & \text{when transmission of the material } Mj \\ & \text{exists} \end{cases}$$

$$\delta t = \begin{cases} 0, & \text{when difftraction of the material } Mj \\ & \text{does not exist} \\ 1, & \text{when difftraction of the material } Mj \\ & \text{exists} \end{cases}$$

$$\delta t = \begin{cases} 0, & \text{when reflection of the material } Mj \\ & \text{does not exist} \\ 1, & \text{when reflection of the material } Mj \\ & \text{exists} \end{cases}$$

$L_t(f, M_j)$, $L_d(f, M_j)$, $L_r(f, M_j)$ are transmission, diffraction and reflection loss parameters of the frequencies respectively corresponding to the material $M_j$ found in the database when the wireless signal frequency is f in the building material wireless propagation loss parameters database; then the sum of attenuation $L_{MAT}(f)$ of transmission, reflection and diffraction due to the building material on the k-th path is calculated in the following formula:

$$L_{MAT}(f) = \sum_{j=1}^{T} (\delta t * L_t(f, M_j) + \delta d * L_d(f, M_j) + \delta r * L_r(f, M_j))$$

(4-4) calculating propagation loss $L(f, d_k)$ of each propagation path through the following formula:

$$L(f, d_k) = L_p(f, d_k) + L_{MAT}(f)$$

(4-5) the sum of the losses of propagation paths of N rays reaching the i-th points is calculated as PL (dB); since energy of each ray propagation path is in linear relationship, the losses of a plurality of propagation paths can be calculated by firstly superpositioning each ray energy (mW), then averaging, and then converting energy values into path loss values; the PL is calculated through the following formula:

$$PL = 10 \lg \left( \frac{1}{N} \sum_{k=1}^{N} \left( 10^{\frac{L(f,d_k)}{10}} \right) \right),$$

(4-6) calculating wireless signal intensity of the reception point i, assuming that $P_i$ is the signal intensity (dBm) of the i-th reception point; $P_t$ is transmitting power (dBm) of the wireless signal transmitting antenna; $G_t$ and $G_r$ are antenna gains (dBi) of the wireless signal transmitting antenna and the reception point respectively, then the signal intensity $P_i$ of the i-th reception point may be calculated through the following formula:

$$P_i = P_t - PL + G_t + G_r$$

(4-7) selecting other transmitting antennas for the wireless access device respectively, repeating the steps (4-1) and (4-6) to obtain the signal field intensities transmitted by all transmitting antennas for the wireless access device reaching the testing point i, selecting the strongest intensity as the signal field intensity of the wireless access device that is received at the point i.

(4-8) separately selecting different testing points, repeating the steps (4-1) to (4-7) to respectively obtain the wireless signal field intensities of the transmitting antennas for the wireless access device at all testing points.

The process of correcting the 3D ray tracing propagation model in the step (5) may be a process in which the building material wireless propagation loss parameters are adjusted using a simulated annealing algorithm.

Before the building material wireless propagation loss parameters are adjusted using a simulated annealing algorithm, it may be required to define the following parameters:

(i) a cost function, the cost function of the simulated annealing algorithm is defined to be a mean square error W between the measured signal intensity $O_i$ and the theoretical wireless signal field intensity $P_i$ at the reception point i, and is represented in the formula $$W = \sqrt{\frac{1}{N_P} \sum_{i=1}^{N_P} (O_i - P_i)^2},$$

thus the above cost function W is related only to $P_i$, while $P_i$ is related only to the building material loss parameters, $N_P$ is the number of the testing points in the correction of the material;

(ii) initial temperature is $t_0$, defining the initial temperature $t_0=1000$ Celsius degree of the simulated annealing algorithm;

(iii) temperature attenuation function $g(\alpha)$: for controlling temperature cooling rate in the annealing process, setting $t_{n+1}=t_n*g(\alpha)$, generally $g(\alpha)$ is ranging from 0.9~0.99, preferably, $g(\alpha)=0.95$, $t_n$ is the temperature after the n times of annealing;

(iv) Markov chain length L, i.e., with the temperature $t_n$, when the maximum number of times of adjustments of the building material wireless propagation loss parameters reaches a maximum, it jumps out of circulation with $t_n$, and setting $L=300$ times;

(v) a transition probability function: when the annealing reaches $t_n$ temperature, if $1<m\leq L$, at the m-th time, adjusting the building material wireless propagation loss parameters, the cost function W calculated from iteration is denoted by W (n,m), when W(n,m) is lower than the cost function W(n,m−1) calculated from the m−1 iteration, namely $\Delta W=W(n,m)-W(n,m-1)<0$, values of the adjusted building material wireless propagation loss parameters is received and transferred unconditionally as a current solution;

when $\Delta W=W(n,m)-W(n,m-1)\geq 0$, then the defined transition probability function receives the values of the adjusted building material wireless propagation loss parameters as the current solutions;

wherein the transition probability function is defined as $\exp(-\Delta W/t_n)$, it can be seen that the transition probability function is a decreasing function of $\Delta W$, when the $\Delta W$ is higher, the transition probability function is smaller, and the probability of receiving a new solution as the current solution is smaller;

(vi) the lowest temperature $t_f$, when the annealing temperature reaches the lowest, the annealing process is ended, setting $t_f=0.01$ Celsius degree;

(vii) when the cost function is smaller than the minimum value Wmin, it shows that enough good building material wireless propagation loss parameters have been obtained, then the annealing process is ended, setting Wmin=5;

the method for correcting the wireless propagation loss parameters on the building material using the simulated annealing algorithm may comprise the steps (5-1) to (5-8):

(5-1) selecting an initial point and initializing it, initial temperature is defined as $t_0$, a group of initial values of the building material wireless propagation loss parameters are default values in the database, including a transmission loss parameter, a diffraction loss parameter and a reflection loss parameter of the building material corresponding to a fixed transmitting frequency, and are denoted by a material parameter matrix $M_{(0,0)}$;

(5-2) firstly, setting the temperature $t_n = t_0$, the material parameter matrix being $M_{(n,m)} = M_{(0,0)}$, calculating the cost function W, the W being denoted by W (0,0), which indicates that when the temperature is $t_0$, the material parameter matrix is the cost function when $M_{(0,0)}$;

(5-3) performing a random perturbation on one of three loss parameters (a transmissive loss parameter, a diffraction loss parameter and a reflection loss parameter) of one material to an element of the material parameter matrix, generating a new material parameter matrix $M_{(n,m)}$, wherein 1<m≤L, calculating the cost function W (n,m), calculating $\Delta W = W(n,m) - W(n,m-1)$;

(5-4) if $\Delta W < 0$, then the adjusted material parameter matrix $M_{(n,m)}$ is a new solution of the building material wireless propagation loss parameters, performing the steps (5-6);

(5-5) if $\Delta W \geq 0$, calculating value of $\exp(-\Delta W/t_n)$, if $\exp(-\Delta W/t_n)$ is greater than a randomly generated number random(0,1] within 0 to 1, namely $\exp(-\Delta W/t_n)$>random(0,1], then the adjusted material parameter matrix $M_{(n,m)}$ is accepted as a new solution of the building material wireless propagation loss parameter; otherwise, the adjusted material parameter matrix $M_{(n,m)}$ is not accepted as ew solution of the building material wireless propagation loss parameter, all parameters in the original material matrix $M_{(n,m-1)}$ are maintained to be unchanged;

(5-6) judging whether or not the internal circulation of the steps (5-3) to (5-6) is ended; when the number of times of the internal circulation is greater than L, jumping out of the internal circulation to proceed to the step (5-7); otherwise, going back to the step (5-3), performing steps (5-3) to (5-6) of the next internal circulation;

(5-7) judging whether or not the external circulation of the steps (5-3) to (5-8) is ended: when the temperature is reduced to be below $t_f$ or the value of the cost function is smaller than the minimum value Wmin, ending the external circulation, the simulated annealing algorithm is ended; otherwise, performing the step (5-8);

(5-8) reducing the annealing temperature according to the temperature attenuation function, jumping back to the step (5-3) to start the steps (5-3) to (5-6) of the internal circulation for the next round;

The process of correcting the 3D ray tracing propagation model parameters means to correct the building material wireless propagation loss parameters at different frequencies respectively based on different mobile communication network standards (different network standards use different wireless signal frequencies), to form wireless propagation model parameters at different frequencies.

The step (7) may determine number and position of sampling points at a certain sampling density (e.g., one per square meter) in a specific curved surface (e.g., one meter from the horizontal plane) within each floor of a building on the basis of floor area of the building space. On the basis of the wireless signal intensity information of the wireless access device in the 3D space that is theoretically calculated in the step (6), wireless signal intensity information at a sampling point may be obtained, position information of the sampling point, wireless access device labeling information at the position and corresponding wireless signal intensity information data are formed into a data record to be stored in the wireless signal fingerprint database. A wireless signal fingerprint data record of each sampling point may be obtained by the same method, to form the wireless signal fingerprint database.

When there is a small quantity of wireless access devices that are changed, due to redundancy of information, for example, there are six wireless access devices in the environment, if one of the six is changed, wireless signal fingerprint database of the remaining unchanged five wireless access devices are continued to be used, so that it is also possible to not update the wireless fingerprint database temporarily.

Beneficial Effect

1. The present invention is applicable to various mobile communication networks (i.e., Wireless Wide Area Network), such as a Global System for Mobile Communications (GSM) network, a General Packet Radio Service (GPRS) network, a Code Division Multiple Access (CDMA) network, a CDMA2000 network, a Wideband Code Division Multiple Access (WCDMA) network, a Long Term Evolution (LTE) network or a World Interoperability for Microwave Access (WiMAX) network, and the present invention is also applicable to various wireless local area network, such as a Wireless Fidelity (WiFi for short) network or other wireless communication networks.

2. For the wireless signal fingerprint database established by adopting such method, the propagation model parameters of the target scene are corrected using a small quantity of measurement results, the wireless signal intensity information of the scene is re-predicted applying the corrected propagation model parameters, so that more accurate prediction result can be obtained, thereby guaranteeing the accuracy of the wireless signal fingerprint database.

3. For the wireless signal fingerprint database established by adopting such method, when the 3D spatial scene model is not change, the transmitting frequency of the wireless signal transmitting antenna is not changed, but other parameter information of the transmitting antenna is changed (for example, the number, the position, the power, and the inclination angle of the transmitting antenna are changed), it is only required to update the transmitting antenna parameter data, and the update of the wireless signal fingerprint database can be completed just by performing prediction using previously corrected propagation model parameters.

4. For the wireless signal fingerprint database established by adopting such method, when the 3D spatial scene model is not changed, but the wireless signal transmitting antenna frequency in the scene is changed (for example, a type of wireless network is newly established), it is not required to re-establish a 3D spatial model parameters, but merely required to correct the wireless propagation model parameters of the scene at the new frequency, and the update of the wireless signal fingerprint database can be completed just by performing prediction using the corrected propagation model parameters.

5. When 4G, 5G networks are applied on a large scale in future, information self-organization of a wireless network access device will be updated very frequently, and a wireless signal fingerprint database will be updated very frequently as well, when the wireless signal fingerprint database is update by applying such method, it is only required to re-store wireless access device information and re-calculate field intensity covered by the wireless network using the ray tracing propagation model algorithm, however, for traditional methods, each change needs a large amount of manual field measurements and thus wastes time and labor. Such method for establishing a wireless signal fingerprint database is easier to use and will become more advantageous compared with the traditional methods when the 4G, 5G networks are applied on a large scale in future.

6. For size of the wireless signal fingerprint database established by adopting such method, a user may make any adjustment according to requirement on accuracy of actual application, and for the positions of data points in the wireless signal fingerprint database, the user may also select at will based on the requirement of the actual application, for example, the data points may be selected in a horizontal plane, may be selected in a vertical plane, or may be selected in any curved surface.

DETAILED DESCRIPTION OF THE EMBODIMENT

Hereinafter the invention is further described with reference to accompanying figures and embodiments.

A method for rapidly establishing an indoor wireless signal fingerprint database according to the present invention is used for establishing an indoor wireless signal fingerprint database for a target building with five floors (600 square meters per floor). The five-floored target building has the same structure at each floor.

Figure 2:
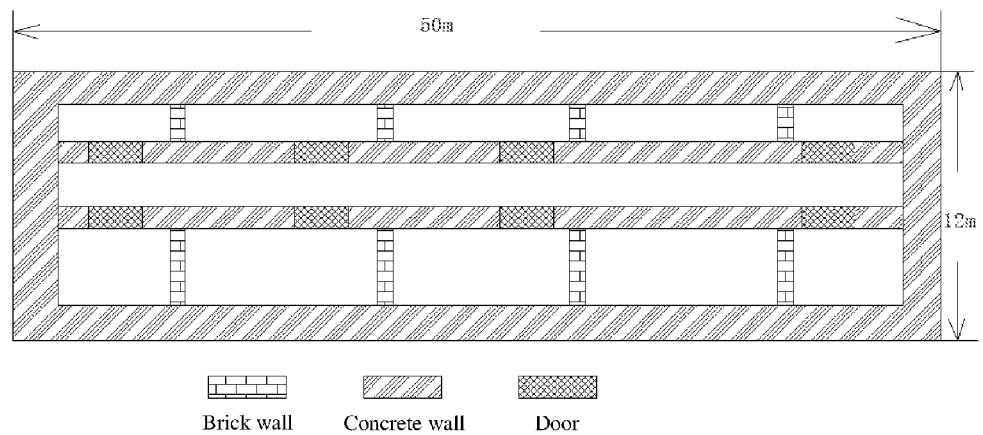
FIG. 2 is structural information on the wireless signal fingerprint database.

FIG. 2 shows planar structure of a 3D spatial model for one floor of the target building constructed based on a target building CAD drawings, 3D spatial building data of each floor includes a vertical storey height of 3 meters, horizontal area of 600 square meters of one floor (50 meters long and 12 meters wide), building material data of the floor, building material wireless propagation loss parameter data.

Figure 1:
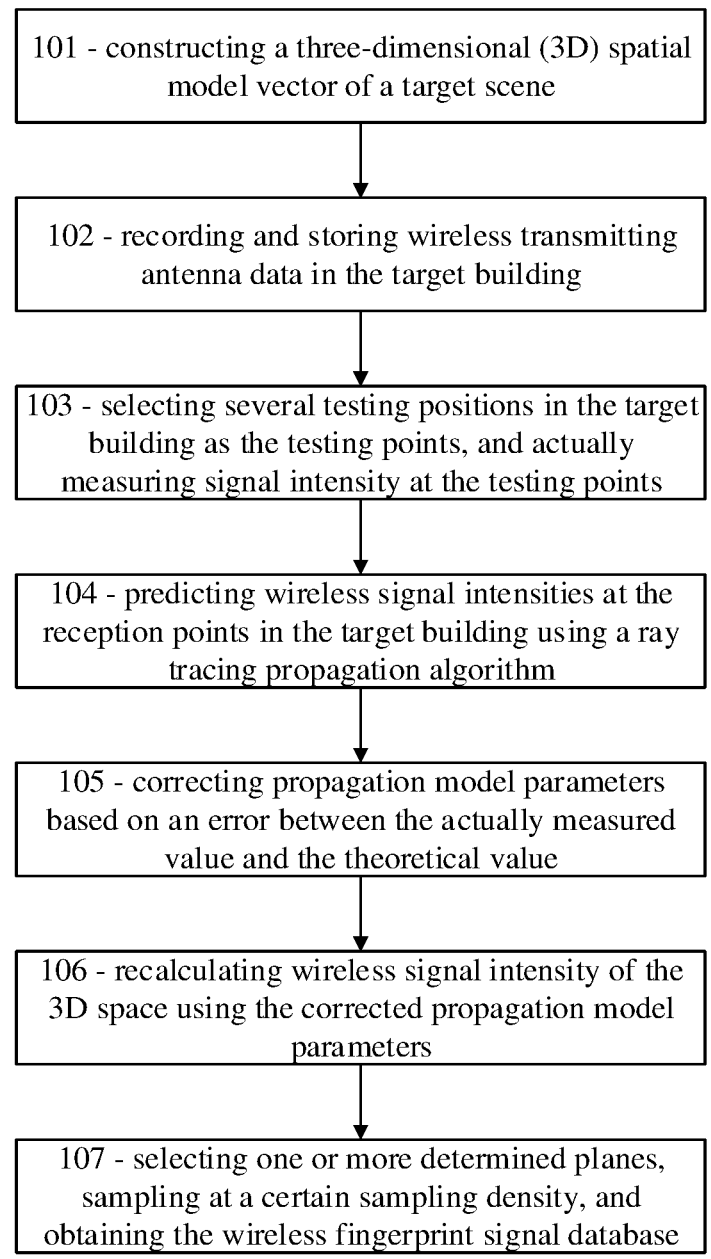
FIG. 1 is the process for rapidly establishing the wireless signal fingerprint database.

As shown in FIG. 1, a method for rapidly establishing an indoor wireless signal fingerprint database, comprising:

(1) 101—extracting 3D spatial building data of the target building of which an indoor wireless signal fingerprint data is required to be established; 3D spatially modeling CAD format drawings by floors based on the CAD format drawings and according to prior modeling technology, and separately storing 3D spatial building data of each floor, the 3D spatial building data including a vertical storey height of the floor, horizontal area of the floor, building material data of the floor and layout structure data of the floor. As shown in FIG. 2, the 3D spatial building data of each floor includes a vertical storey height of the floor of 3 meters, horizontal area of the floor of 600 square meters (50 meters long and 12 meters wide), building material data of the floor, and building material wireless propagation loss parameter data.

The present invention is applicable to various indoor 3D building scenes, indoor and outdoor combined 3D scenes, such as airports, stations, shopping malls, stadiums, tunnels, schools, residential areas and the like.

(2) 102—recording and storing the wireless access device information that can be received in the building as described in the step (1), the building in the embodiment is provided with a WCDMA system and a WiFi wireless local area network, the WCDMA system is an indoor distributed system that provides signal sources by the wireless access device (NodeB), the system is provided with three transmitting antennas at each floor and thus is provided with the total of 15 transmitting antennas; the WiFi wireless local area network is provided with one access point (AP) at each floor, and thus is provided with the total of 5 network access points, recording data of the transmitting antennas of the WCDMA indoor distributed system and the WiFi access points in the building, respectively. The transmitting antenna data includes specific position information of each transmitting antenna in the building, signal frequency of the transmitting antenna, transmitting power of the transmitting antenna, 3D radiation parameters of the transmitting antenna, an inclination angle of the transmitting antenna.

Figure 3:
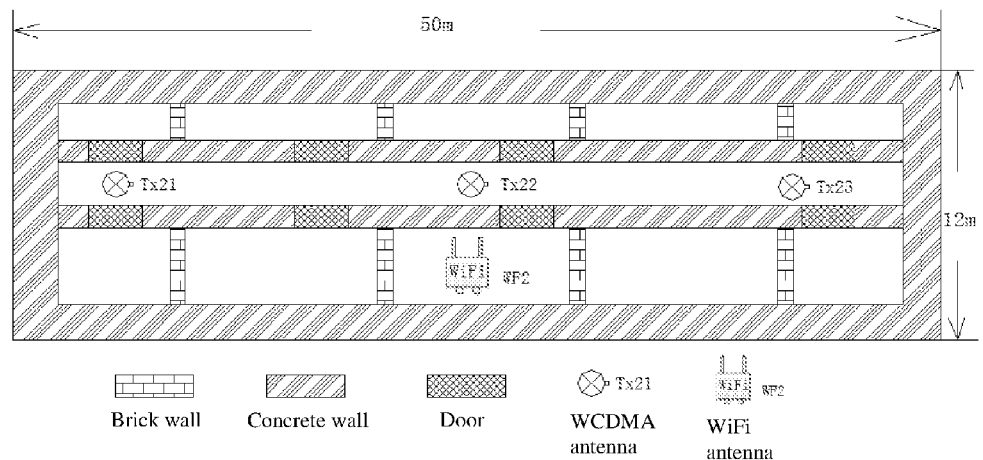
FIG. 3 is position information on the transmitting antenna on the second floor of the 3D building.

FIG. 3 shows information of locations of 3 WCDMA transmitting antennas (denoted as Tx21, Tx22, Tx23 respectively) and one WiFi transmitting antenna (WF2) on the second floor of the building. The transmitting power of the transmitting antenna of the WCDMA is 20 dBm, the signal frequency of the transmitting antenna is 2100 MHz, all of the transmitting antennas are gained to be omnidirectional antennas of 3 dBi, and a lower inclination angle of the transmitting antenna is 5°. The transmitting power of the transmitting antenna of the WiFi access point is 15 dBm, the signal frequency of the transmitting antenna is 2400 MHz, all of the transmitting antennas are gained to be omnidirectional antennas of 3 dBi, and a lower inclination angle of the transmitting antenna is 5°.

The present invention is not limited to the combination of the WCDMA network and the WiFi network, and is also applicable to combination of one or more other wireless communication networks (wireless wide area networks and wireless local area networks). The technical solution of the present invention is not only applicable to indoor the indoor distributed system and indoor environment covered by the WiFi access points, but also applicable to indoor or outdoor combined scene covered separated or jointly by other various wireless coverage forms such as a macro cell, a micro cell, a pico cell, BBU+RRU, a repeater and the like, location of the wireless access device is not limited to indoor, but can be outdoor, for example, outdoor space covered by outdoor antennas.

Figure 4:
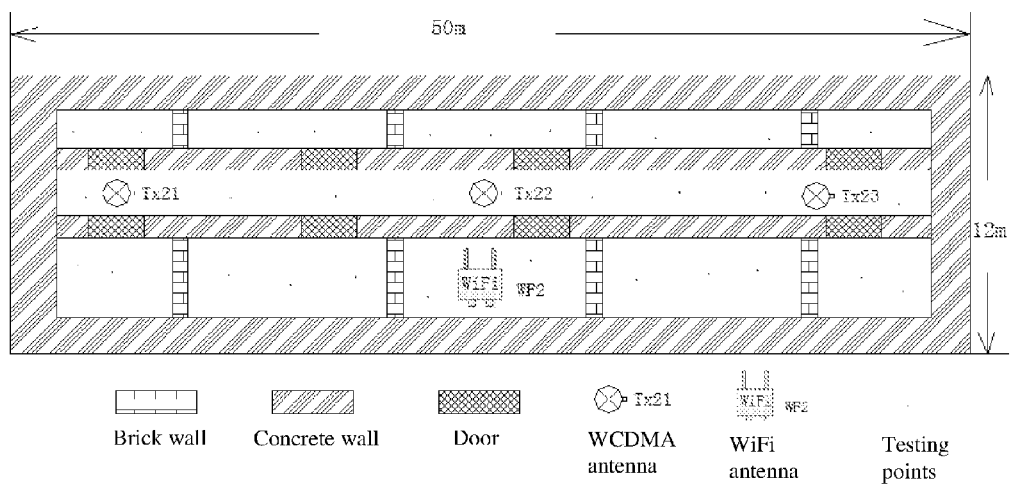
FIG. 4 is information on 30 testing positions in the 3D building.
Figure 5:
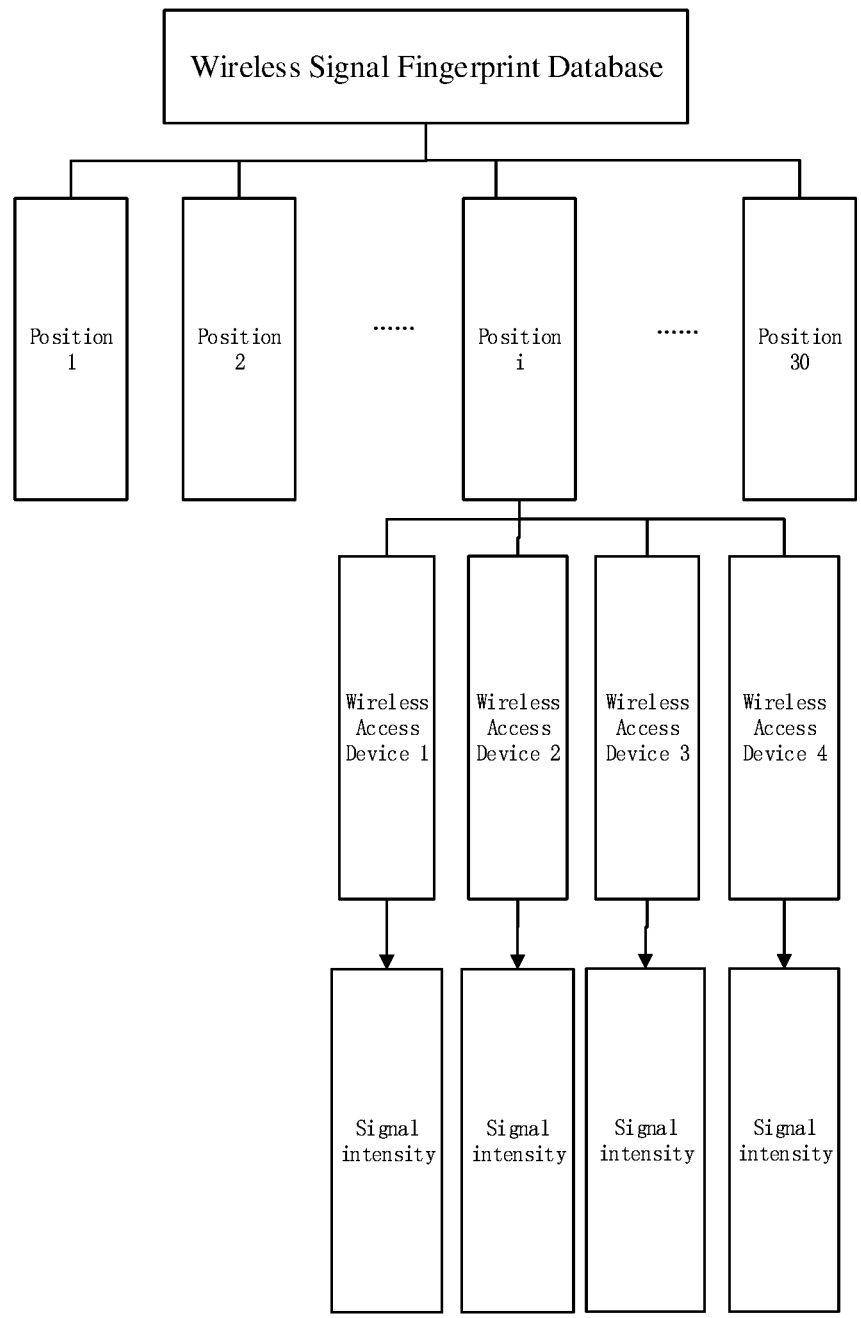
FIG. 5 is a structural information diagram of the wireless signal fingerprint database.

(3) 103—selecting 30 testing points at positions 1 meter distance from the horizontal plane of the second floor of the building, as shown in FIG. 4, a testing terminal is carried to measure on site wireless signal fingerprint information of the selected testing positions, signals of the WCDMA indoor distributed system transmitting antennas come from the same cell of the same WCDMA wireless access device, and thus have the same device labeling. Each WiFi access point has a device labeling, herein it is assumed that each WiFi access point can affect the floor where the WiFi access point is located as well as upper and lower floors, accordingly, on the second floor of the building, a reception device can receive one signal from the WCDMA system and three signals from the WiFi system. Each wireless fingerprint data record will contain four device labeling and corresponding signal intensity. FIG. 5 is a structural diagram of the wireless signal fingerprint data at the 30 testing positions.

The testing terminal involved in the embodiment of the invention may include but is not limited to a personal cell phone, a hand-held spectrum analyzer, a personal digital assistant (PDA), a wireless Internet access netbook, a personal computer, a portable computer and the like.

In the embodiment of the present invention, a horizontal plane of 1 meter of the second floor is selected, however, the technical solution of the invention may select any one or more floors, may select any one or more planes which may be any horizontal plane, vertical plane, curved surface or combination thereof.

(4) 104—theoretically predicting wireless signal fingerprint data at the 30 positions labeled in the step (3) using the ray tracing propagation model algorithm, the process of predicting fingerprint data is performed one wireless communication system after another, herein comprising predicting the one WCDMA indoor distributed system in the step (2) and predicting wireless signal intensity information at the 30 testing points of 3 wireless access devices of one WiFi system in the step (3). Specific steps are as described in the steps (4-1) to (4-8).

Figure 6:
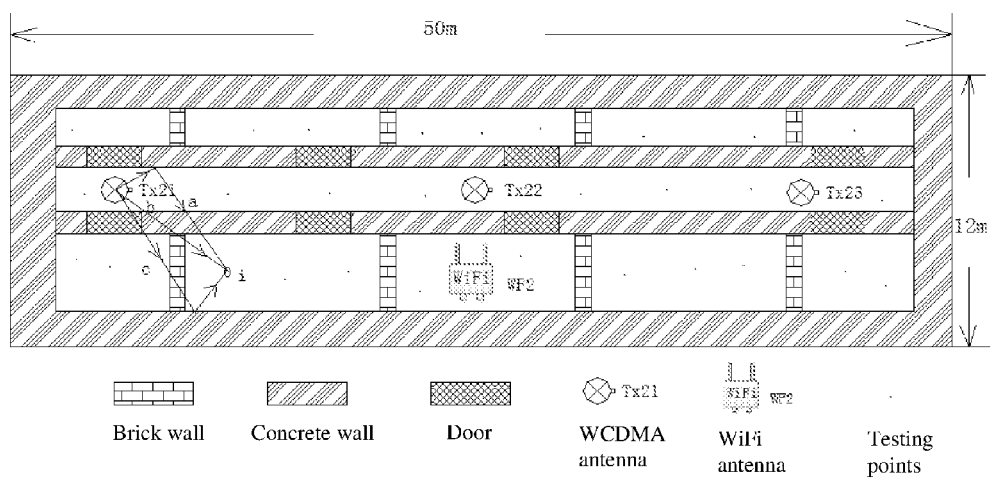
FIG. 6 is a schematic diagram of projection paths of three rays transmitted by left side WCDMA antenna that can be received at the point i.

Wherein, signal intensity of a transmitting antenna received from a reception point within the target building is predicted using ray tracing propagation model algorithm, specific steps are as described in the steps (4-1) to (4-6):

(4-1) determining all propagation paths in which rays transmitted by the left side WCDMA wireless transmitting antennas reach the reception point i based on the positions of the left WCDMA wireless transmitting antennas and the reception point i, wherein the propagation paths comprise N=3 ray propagation paths, a ray path a, a ray path b, a ray path c; as shown in FIG. 6.

The ray path a is that the ray is reflected by concrete wall, then penetrates through the concrete wall to reach the reception point i; the ray path b is that the ray penetrates through the concrete wall and brick wall to reach the reception point i; the ray path c is that the ray penetrates through a wood door and brick wall, and is reflected by the concrete wall to reach the reception point i;

(4-2) calculating propagation loss of each propagation path in free space, the above ray path a, ray path b and ray path c have length of 6.6 meters, 5.2 meters and 7.1 meters respectively, the transmitting frequency of the wireless signal is 2.1 GHz;

wherein the loss value of the k-th path in the free space is $L_p(f, d_k)$ ($1 \leq k \leq 3$), f is wireless signal frequency (MHz), $d_k$ is distance (km) that the k-th path transfers in the free space; regardless of transmission, reflection and diffraction phenomenon, the loss value (dB) of the k-th path in the free space is calculated in the following formula:

$$L_p(f, d_k) = 20 \log 10(f) + 20 \log 10(d_k) + 32.45$$

according to $L_p(f, d_k) = 20 \log 10(f) + 20 \log 10(d_k) + 32.45$, losses of the above ray paths a, b and c in the free space are calculated as 55.29 dB, 53.21 dB, 55.92 dB.

(4-3) calculating loss of each ray path under the influence of the building material, wherein $L_{MAT}(f)$ is the sum of attenuation of transmission, reflection and diffraction due to the building material on the k-th path; T is the total amount of the building material within the target building, the j-th kinds of material is represented as $M_k$ ($1 \leq j \leq T$), $\delta t$, $\delta d$, $\delta r$ are coefficients respectively indicating whether or not the wireless signals on the k-th path are in transmissive, diffractive, reflective relationship with the building material, $$\delta t = \begin{cases} 0, & \text{when transmission of the material } Mj \text{ does not exist} \\ 1, & \text{when transmission of the material } Mj \text{ exists} \end{cases}$$

$$\delta t = \begin{cases} 0, & \text{when difftraction of the material } Mj \text{ does not exist} \\ 1, & \text{when difftraction of the material } Mj \text{ exists} \end{cases}$$

$$\delta t = \begin{cases} 0, & \text{when reflection of the material } Mj \text{ does not exist} \\ 1, & \text{when reflection of the material } Mj \text{ exists} \end{cases}$$

$L_t(f, M_j)$, $L_d(f, M_j)$, $L_r(f, M_j)$ are transmission, diffraction and reflection loss parameters of the frequency bands respectively corresponding to the material $M_j$ found in the database when the wireless signal frequency is f in the building material wireless propagation loss parameters database; then the sum of attenuation $L_{MAT}(f)$ of transmission, reflection and diffraction due to the building material on the k-th path is calculated in the following formula:

$$L_{MAT}(f) = \sum_{j=1}^{T} (\delta t * L_t(f, M_j) + \delta d * L_d(f, M_j) + \delta r * L_r(f, M_j))$$

according to the building material wireless propagation loss parameter database, when the wireless signal frequency is 2.1 GHz, transmissive losses of the brick wall, the concrete wall and the wood door are 6.77 dB, 20.25 dB, 4.44 dB respectively, according to the formula $$L_{MAT}(f) = \sum_{j=1}^{T} (\delta t * L_t(f, M_j) + \delta d * L_d(f, M_j) + \delta r * L_r(f, M_j)),$$

the loss of the path a is the sum of the reflective loss of the concrete wall and the transmissive loss of the concrete wall; the loss of the path b is the sum of the transmissive loss of the concrete wall and the transmissive loss of the brick wall;

the loss of the path c is the sum of the transmissive loss of the wood door and the transmissive loss of the brick wall; the losses of the above ray paths a, b and c due to the influence of the building material are calculated as 26.25 dB, 27.02 dB, 17.21 dB respectively;

(4-4) calculating propagation loss $L(f, d_k)$ of each ray path through the following formula:

$$L(f,d_k)=L_p(f,d_k)+L_{MAT}(f)$$

according to the formula $L(f, d_k)=L_p(f, d_k)+L_{MAT}(f)$, the propagation losses $L(f, d_k)$ of the above three ray paths a, b and c reaching the reception point i are calculated as 81.54 dB, 80.23 dB, 73.13 dB respectively.

(4-5) the sum of the losses of propagation paths of N=3 rays reaching the i-th points is calculated as PL (dB); since energy of each ray path is in linear relationship, the losses of a plurality of propagation paths can be calculated by firstly superpositioning each ray energy (mW), then averaging, and then converting energy values into path loss values; the PL is calculated through the following formula:

$$PL = 10 \lg \left( \frac{1}{N} \sum_{k=1}^{N} \left( 10^{-\frac{L(f,d_k)}{10}} \right) \right),$$

the total loss of the above three ray paths are calculated as PL=79.52 dB.

(4-6) calculating wireless signal intensity of the reception point i, assuming that $P_i$ is the signal intensity (dBm) of the i-th reception point; $P_t$ is transmitting power (dBm) of the wireless signal transmitting antenna; $G_t$ and $G_r$ are antenna gains (dBi) of the wireless signal transmitting antenna and the reception point respectively, then the signal intensity $P_i$ of the i-th reception point is calculated through the following formula:

$$P_i=P_t-PL+G_t+G_r$$

since it is stated in the step (2) that both of the wireless transmitting antenna and the reception point i have the antenna gain of 3 dBi, the transmitting power of the wireless transmitting antenna is 20 dBm, then according to the formula $P_i=P_t-PL+G_t+G_r$, the wireless signal field intensity at the reception point i is $P_i=-53.52$ dBm;

(4-7) it can be calculated by repeating the steps (4-1) to (4-6) that, field intensities of the transmitting antennas of other WCDMA indoor system at the point i are all smaller than -53.52 dBm, since the 15 WCDMA transmitting antennas belong to the same wireless access device, the wireless signal field intensity of the WCDMA system that can be received at the reception point i is -53.52 dBm.

The signal field intensity generated by the WiFi antenna WF2 of the floor where the WF2 is located at this point can be calculated by repeating the steps (4-1) to (4-6). Since the transmitting antenna of the WiFi system may affect upper and lower floors, it is necessary to calculate the signal field intensity generated by the WiFi antenna WF1 on the first floor at this point, and the signal field intensity generated by the WiFi antenna WF3 on the third floor at this point.

(4-8) The wireless signal field intensities generated by one WCDMA wireless access device and three WiFi wireless access devices at the selected other 29 testing positions can be calculated with the same method by repeating the steps (4-1) to (4-7).

(5) 105—According to analysis through comparison between the actually measured value measured in the step (3) and the theoretical value calculated in the step (4), the propagation model parameters are corrected using the simulated annealing algorithm, so that the mean square error between the actually measured value and the theoretical value is the minimum. The process of correcting the propagation model parameters using the simulated annealing algorithm is a process in which the building wireless propagation loss parameters are adjusted using the simulated annealing algorithm.

Figure 7:
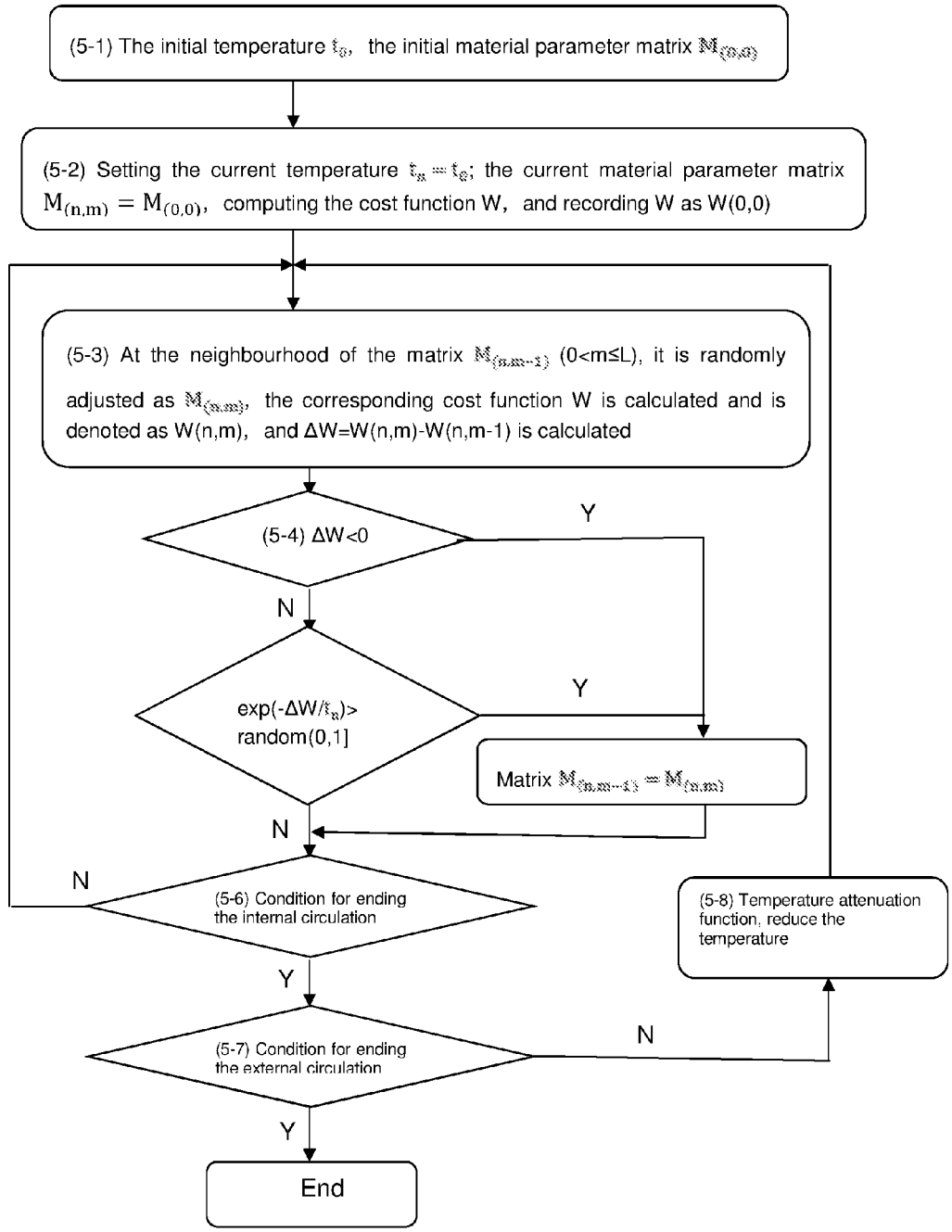
FIG. 7 is a flowchart of adjusting the building material wireless propagation loss parameters by the simulated annealing algorithm.

Before the building material wireless propagation loss parameters are adjusted using a simulated annealing algorithm, it is required to define the following parameters:

(i) a cost function, the cost function of the simulated annealing algorithm is defined to be a mean square error W between the measured signal intensity $O_i$ and the theoretical wireless signal field intensity $P_i$ at the reception point i, and is represented in the formula $$W = \sqrt{\frac{1}{N_P} \sum_{i=1}^{N_P} (O_i - P_i)^2} ,$$

thus the above cost function W is related only to $P_i$, while $P_i$ is related only to the building material loss parameters, $N_P$ is the number of the testing points in the correction of the material, $N_P=30$;

(ii) initial temperature is $t_0$, defining the initial temperature $t_0=1000$ Celsius degree of the simulated annealing algorithm;

(iii) temperature attenuation function $g(\alpha)$: for controlling temperature cooling rate in the annealing process, setting $t_{n+1}=t_n*g(\alpha)$, generally $g(\alpha)$ is ranging from 0.9~0.99, preferably, $g(\alpha)=0.95$, $t_n$ is the temperature after the n times of annealing;

(iv) Markov chain length L, i.e., with the temperature $t_n$, when the maximum number of times of adjustments of the building material wireless propagation loss parameters reaches a maximum, it jumps out of circulation with $t_n$, and setting L=300 times; a transition probability function: when the annealing reaches $t_n$ temperature, if 1<m≤L, at the m-th time, adjusting the building material wireless propagation loss parameters, the cost function W calculated from iteration is denoted by W(n,m), when W(n,m) is lower than the cost function W(n,m−1) calculated from the m−1 iteration, namely ΔW=W(n,m)−W(n,m−1)<0, values of the adjusted building material wireless propagation loss parameters is received and transferred unconditionally as a current solution; when ΔW=W(n,m)−W(n,m−1)≥0, then the defined transition probability function receives the values of the adjusted building material wireless propagation loss parameters as the current solutions; wherein the transition probability function is defined as exp(−ΔW/$t_n$), it can be seen that the transition probability function is a decreasing function of ΔW, when the ΔW is higher, the transition probability function is smaller, and the probability of receiving a new solution as the current solution is smaller;

(vi) the lowest temperature $t_f$, when the annealing temperature reaches the lowest, the annealing process is ended, setting $t_f=0.01$ Celsius degree;

(vii) when the cost function is smaller than the minimum value Wmin, it shows that enough good building material wireless propagation loss parameters have been obtained, then the annealing process is ended, setting Wmin=5; the method for correcting the wireless propagation loss parameters on the building material using the simulated annealing algorithm comprises the steps (5-1) to (5-8): as shown in FIG. 7.

(5-1) selecting an initial point and initializing it, initial temperature is defined as $t_0$, a group of initial values of the building material wireless propagation loss parameters are default values in the database, including a transmission loss parameter, a diffraction loss parameter and a reflection loss parameter of the building material corresponding to a fixed transmitting frequency, and are denoted by a material parameter matrix $M_{(0,0)}$;

(5-2) firstly, setting the temperature $t_n=t_0$, the material parameter matrix being $M_{(n,m)}=M_{(0,0)}$, calculating the cost function W, the W being denoted by W (0,0), which indicates that when the temperature is $t_0$, the material parameter matrix is the cost function when $M_{(0,0)}$;

(5-3) performing a random perturbation on one of three loss parameters (a transmissive loss parameter, a diffraction loss parameter and a reflection loss parameter) of one material to an element of the material parameter matrix, generating a new material parameter matrix $M_{(n,m)}$, wherein 1<m≤L, calculating the cost function W (n,m), calculating $\Delta W=W(n,m)-W(n,m-1)$;

(5-4) if $\Delta W<0$, then the adjusted material parameter matrix $M_{(n,m)}$ is a new solution of the building material wireless propagation loss parameters, performing the steps (5-6);

(5-5) if $\Delta W \geq 0$, calculating value of $\exp(-\Delta W/t_n)$, if $\exp(-\Delta W/t_n)$ is greater than a randomly generated number random(0,1] within 0 to 1, namely $\exp(-\Delta W/t_n)>$random(0,1], then the adjusted material parameter matrix $M_{(n,m)}$ is accepted as a new solution of the building material wireless propagation loss parameter; otherwise, the adjusted material parameter matrix $M_{(n,m)}$ is not accepted as ew solution of the building material wireless propagation loss parameter, all parameters in the original material matrix $M_{(n,m-1)}$ are maintained to be unchanged;

(5-6) judging whether or not the internal circulation of the steps (5-3) to (5-6) is ended; when the number of times of the internal circulation is greater than L, jumping out of the internal circulation to proceed to the step (5-7); otherwise, going back to the step (5-3), performing steps (5-3) to (5-6) of the next internal circulation;

(5-7) judging whether or not the external circulation of the steps (5-3) to (5-8) is ended: when the temperature is reduced to be below $t_f$ or the value of the cost function is smaller than the minimum value Wmin, ending the external circulation, the simulated annealing algorithm is ended; otherwise, performing the step (5-8);

(5-8) reducing the annealing temperature according to the temperature attenuation function, jumping back to the step (5-3) to start the steps (5-3) to (5-6) of the internal circulation for the next round;

The process of correcting the propagation model parameters means to correct the wireless propagation model parameters at different frequencies respectively based on different mobile communication network standards (different network standards use different wireless signal frequencies). Herein, it is necessary to correct the wireless propagation model parameters of the WCDMA network (frequency of 2100 MHz) and the WiFi network (frequency of 2400 MHz).

(6) 106—by using the propagation model parameters corrected in the step (5), recalculating wireless signal coverage intensity information generated by the 15 transmitting antennas and the 5 WiFi access devices of one WCDMA wireless access device in the 3D building of the five-floor building in the step (1) using the ray tracing propagation model algorithm.

(7) 107—determining the number of the sampling points as 3000 and setting 600 sampling points on each floor at the sampling density of 1 per square meter on the basis of floor area (area of a single floor is 600 square meters, area of five floors is totally 3000 square meters) of the building space. Positions of the sampling points are determined in the horizontal plane of one meter on each floor. On the basis of the field intensity of the wireless access device that is theoretically calculated in the step (6), wireless signal intensity information that can be received at a sampling point is obtained, position information of the sampling point, wireless access device labeling information at the position and corresponding wireless signal intensity information data are formed into a data record to be stored in the wireless signal fingerprint database. A wireless signal fingerprint data record of each sampling point is obtained by the same method, to form the wireless signal fingerprint database.

It is necessary to note that, in the embodiment of the present invention, sampling is performed at a sampling density of 1 per square meter in the horizontal plane of one meter, and the wireless signal fingerprint database is determined. The technical solution of the present invention supports sampling in any one or more planes including horizontal planes, vertical planes, curved surfaces, and supports to establish the wireless signal fingerprint database at any sampling densities.

Although the specific embodiment of the invention has been described with reference to the accompanying drawings, it is not to limit the protection scope of the invention. Persons skilled in the art should understand that, on the basis of the technical solution of the invention, various modifications or variations that can be made by persons skilled in the art without making any creative efforts still fall within the protection scope of the invention.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for rapidly establishing an indoor wireless signal fingerprint database, comprising the following steps:

Step (1): constructing an indoor and outdoor combined three-dimensional spatial structural model of a target scene, wherein the scene comprises an indoor three-dimensional scene of a target building and an outdoor three-dimensional scene around the target building;

Step (2): recording and storing information of wireless access device which can be received at the target scene;

Step (3): selecting testing points in the indoor of the target building to perform measurement on site and recording the wireless signal fingerprint information that is actually measured at the selected testing points, the wireless signal fingerprint information that is actually measured refers to an identification information and the actual wireless signal strength information of the wireless access device transmitted by the wireless access device in the step (2);

Step (4): obtaining theoretical wireless signal fingerprint information of the testing points selected in the step (3), wherein the theoretical wireless signal fingerprint information includes wireless access device labeling information and the theoretical wireless signal intensity information that is obtained through calculation by a propagation model algorithm;

Step (5): calibrating parameters of the propagation model depending on difference between the wireless signal intensity information that is actually measured in the step (3) and the wireless signal intensity information that is calculated theoretically in the step (4);

Step (6): recalculating the wireless signal intensity information of the wireless access device of the step (2) at the indoor and outdoor combined 3D spatial structural model as described in the step (1) using the calibrated parameters of the propagation model;

Step (7): determining number and position of sampling points at a set sampling density on a set horizontal plane within each floor of a building on the basis of floor area of the building space; forming position information of a sampling point, wireless access device labeling information at the position and corresponding wireless signal intensity information data of the sampling point calculated in the step (6) into a data record to be stored in the wireless signal fingerprint database; obtaining wireless signal fingerprint data records of all other sampling points by the same method, to form the wireless signal fingerprint database.

2. The method for rapidly establishing an indoor wireless signal fingerprint database according to claim 1, characterized in that, the wireless signal fingerprint database comprises a plurality of wireless signal fingerprint data records, each of which comprises geographical location information, labeling information and signal intensity information that can be received from one or more wireless access devices on the geographical location.

3. The method for rapidly establishing an indoor wireless signal fingerprint database according to claim 1, characterized in that, when the indoor and outdoor combined 3D spatial structure in the step (1) is changed, recalculating and updating the wireless signal fingerprint database using the steps (1) to (7).

4. The method for rapidly establishing an indoor wireless signal fingerprint database according to claim 1, characterized in that, when the transmitting antenna frequency of the wireless access device in the step (2) is changed, recalculating and updating the wireless signal fingerprint database reusing the steps (2) to (7);

when other parameters except the transmitting antenna frequency of the wireless access device in the step (2) are changed, recalculating and updating the wireless signal fingerprint database by reusing the steps (6) and (7), wherein the other parameters include number of the transmitting antenna, position of the transmitting antenna, transmitting power, 3D radiation parameters of the transmitting antenna, inclination angle of the transmitting antenna.

5. The method for rapidly establishing an indoor wireless signal fingerprint database according to claim 1, characterized in that, the step (1) specifically comprises: converting a building drawings in a CAD format of the target building into a 3D spatial structural model of the building, converting a GIS map around the building into an outdoor 3D spatial structural model, combining the indoor 3D spatial structural model of the target building and the outdoor 3D spatial structural model around the building into an indoor and outdoor combined 3D spatial structural model of the scene, recording and storing a 3D spatial structural model data which includes size of the building, layout structure of the building, building material and wireless propagation loss parameters of the building material.

6. The method for rapidly establishing an indoor wireless signal fingerprint database according to claim 1, characterized in that, the wireless access device in the step (2) comprises a wireless communication base station or a wireless local area network access point.

7. The method for rapidly establishing an indoor wireless signal fingerprint database according to claim 1, characterized in that, the wireless access device in the step (2) comprises transmitting antenna data corresponding to each wireless access device, the transmitting antenna data comprises number of the transmitting antennas, specific location information of the transmitting antennas, signal frequency of the transmitting antennas, transmission power of the transmitting antennas, 3D radiation parameters of the transmitting antennas and the downtilt of the transmitting antennas.

8. The method for rapidly establishing an indoor wireless signal fingerprint database according to claim 1, characterized in that, the positions of testing points in the step (3) are selected depending on complexity of the building model, size of the building, difficulty of on-site measurement; and the positions of the testing points having large enough intervals to guarantee that different wireless signal fingerprint data information can be distinguished.

9. The method for rapidly establishing an indoor wireless signal fingerprint database according to claim 1, wherein the propagation model is a 3D ray tracing propagation model; and the corrected propagation model is a corrected 3D ray tracing propagation model.

* * * * *